United States Patent
Cottrell et al.

(10) Patent No.: US 8,612,029 B2
(45) Date of Patent: Dec. 17, 2013

(54) FRAMEWORK AND METHOD FOR MONITORING EQUIPMENT

(75) Inventors: Michael Edward Cottrell, Nigg Aberdeen Aberdeenshire (GB); Kenneth John Innes, Nigg Aberdeen Aberdeenshire (GB); James Po-Cheung Kong, Katy, TX (US); Charles Anthony Lickteig, Katy, TX (US); Robert Frank Parchewsky, The Hague, CA (US); Steven Michael Schultheis, Kuala Lumpur (MY); Daniel Dazhang Ying, Kuala Lumpur (MY)

(73) Assignee: Shell Oil Company, Houston, TX (US)

( * ) Notice: Subject to any disclaimer, the term of this patent is extended or adjusted under 35 U.S.C. 154(b) by 265 days.

(21) Appl. No.: 12/664,098

(22) PCT Filed: Jun. 16, 2008

(86) PCT No.: PCT/US2008/067119
§ 371 (c)(1),
(2), (4) Date: May 24, 2010

(87) PCT Pub. No.: WO2008/157494
PCT Pub. Date: Dec. 24, 2008

(65) Prior Publication Data
US 2010/0257410 A1 Oct. 7, 2010

Related U.S. Application Data

(60) Provisional application No. 60/944,286, filed on Jun. 15, 2007.

(51) Int. Cl.
*G05B 11/01* (2006.01)
*G06F 11/34* (2006.01)

(52) U.S. Cl.
USPC ............ 700/78; 714/100; 714/45; 706/12; 706/47; 706/48; 702/62; 702/188; 702/184; 340/10.1; 369/59.17; 700/170

(58) Field of Classification Search
USPC ............ 706/12, 47, 48; 714/100; 359/59.17, 359/59.21, 59.23; 341/155, 158
See application file for complete search history.

(56) References Cited

U.S. PATENT DOCUMENTS 3,611,290 A * 10/1971 Luisi et al. ............ 382/125
4,559,610 A 12/1985 Sparks et al. ............ 364/803

(Continued)

FOREIGN PATENT DOCUMENTS

| EP | 1489474 | 12/2004 | ............ G05B 23/02 |
| GB | 2414560 | 7/2007 | ............ G02M 15/02 |

(Continued)

OTHER PUBLICATIONS

General Electric, "System 1 Optimization and Diagnostic Platform", May 2011, http://www.ge-mcs.com/download/bently-nevada-software/sys1_brochure.pdf, pp. 12.*

(Continued)

*Primary Examiner* — Ryan Jarrett
*Assistant Examiner* — Olvin Lopez Alvarez

(57) ABSTRACT

A system includes at least one piece of equipment. The system also includes a state detector adapted to measure one or more operating parameters of the equipment. The system has a signature generator adapted to encode a plurality of data streams from the state detector into an operating signature for the equipment.

10 Claims, 10 Drawing Sheets

(56) References Cited

U.S. PATENT DOCUMENTS

| | | | | |
|---|---|---|---|---|
| 4,561,402 | A | | 12/1985 | Nakano et al. ............... 123/489 |
| 5,170,338 | A | * | 12/1992 | Moritoki et al. ................. 700/2 |
| 5,175,545 | A | * | 12/1992 | Uchiyama et al. .............. 341/59 |
| 5,210,704 | A | * | 5/1993 | Husseiny ........................ 702/34 |
| 5,355,735 | A | * | 10/1994 | Miller et al. ............... 73/861.05 |
| 5,437,254 | A | | 8/1995 | Korenaga et al. ............. 123/416 |
| 5,461,311 | A | | 10/1995 | Nakazato et al. ......... 324/207.24 |
| 5,581,664 | A | * | 12/1996 | Allen et al. ...................... 706/46 |
| 5,890,142 | A | | 3/1999 | Tanimura et al. ............... 706/12 |
| 5,930,136 | A | * | 7/1999 | Nakajima et al. ............... 700/44 |
| 6,292,757 | B1 | | 9/2001 | Flanagan et al. .............. 702/138 |
| 6,353,390 | B1 | * | 3/2002 | Beri et al. .................... 340/572.1 |
| 6,445,969 | B1 | * | 9/2002 | Kenney et al. ................. 700/108 |
| 6,453,265 | B1 | | 9/2002 | Dekhil et al. .................. 702/181 |
| 6,522,768 | B1 | * | 2/2003 | Dekhil et al. .................. 382/100 |
| 6,646,564 | B1 | | 11/2003 | Azieres et al. ................. 340/679 |
| 6,701,195 | B2 | * | 3/2004 | Brown et al. ................... 700/44 |
| 6,745,321 | B1 | | 6/2004 | Floyd et al. .................... 712/227 |
| 6,748,341 | B2 | | 6/2004 | Crowder, Jr. .................. 702/181 |
| 6,757,342 | B1 | * | 6/2004 | Nakamura et al. ............. 375/334 |
| 6,819,327 | B2 | | 11/2004 | Wasserman et al. ........... 345/581 |
| 6,947,797 | B2 | * | 9/2005 | Dean et al. ...................... 700/79 |
| 6,955,302 | B2 | | 10/2005 | Erdman, Jr. ...................... 236/51 |
| 6,970,124 | B1 | | 11/2005 | Patterson ........................ 341/155 |
| 6,995,702 | B2 | * | 2/2006 | Herriot et al. .................. 341/155 |
| 6,999,884 | B2 | * | 2/2006 | Astley et al. ..................... 702/56 |
| 7,044,373 | B1 | | 5/2006 | Garber et al. .................. 235/385 |
| 7,082,352 | B2 | * | 7/2006 | Lim ................................ 700/276 |
| 7,123,151 | B2 | | 10/2006 | Garber et al. ................ 340/572.4 |
| 7,209,860 | B2 | * | 4/2007 | Trsar et al. ..................... 702/183 |
| 7,333,906 | B2 | * | 2/2008 | Reeve et al. ................... 702/81 |
| 7,490,073 | B1 | * | 2/2009 | Qureshi et al. ................. 706/50 |
| 7,596,626 | B2 | * | 9/2009 | Fdida et al. .................... 709/232 |
| 7,596,718 | B2 | * | 9/2009 | Harvey et al. ................... 714/25 |
| 7,747,417 | B2 | * | 6/2010 | Lamontagne ................. 702/188 |
| 7,934,125 | B2 | * | 4/2011 | Harvey et al. ................... 714/25 |
| 7,953,842 | B2 | * | 5/2011 | Dillon et al. ................... 709/224 |
| 8,010,321 | B2 | * | 8/2011 | Lin et al. ....................... 702/185 |
| 2001/0053940 | A1 | | 12/2001 | Horn et al. ..................... 700/32 |
| 2002/0161940 | A1 | | 10/2002 | Eryurek et al. ................. 710/15 |
| 2002/0183971 | A1 | * | 12/2002 | Wegerich et al. ............. 702/185 |
| 2004/0003318 | A1 | | 1/2004 | Felke et al. .................... 714/25 |
| 2004/0153437 | A1 | | 8/2004 | Buchan ............................ 707/1 |
| 2004/0158474 | A1 | | 8/2004 | Karschnia et al. ................ 705/1 |
| 2005/0007249 | A1 | | 1/2005 | Eryurck et al. ................. 340/511 |
| 2005/0007826 | A1 | | 1/2005 | Boggs et al. .............. 365/189.01 |
| 2005/0021302 | A1 | * | 1/2005 | Dimino et al. ................. 702/185 |
| 2005/0049832 | A1 | | 3/2005 | Gorinevsky ................... 702/182 |
| 2005/0080596 | A1 | * | 4/2005 | Duckert et al. ................ 702/184 |
| 2005/0114743 | A1 | * | 5/2005 | Moorhouse ................... 714/100 |
| 2005/0159922 | A1 | | 7/2005 | Hsiung et al. ................. 702/182 |
| 2005/0205037 | A1 | | 9/2005 | Lewis et al. .............. 123/179.16 |
| 2005/0267702 | A1 | * | 12/2005 | Shah et al. ....................... 702/81 |
| 2006/0036403 | A1 | * | 2/2006 | Wegerich et al. ............. 702/183 |
| 2006/0071666 | A1 | | 4/2006 | Unsworth et al. ............. 324/522 |
| 2006/0195201 | A1 | * | 8/2006 | Nauck et al. .................... 700/30 |
| 2007/0106453 | A1 | * | 5/2007 | Yokohata et al. .............. 701/115 |
| 2007/0259256 | A1 | * | 11/2007 | Le Canut et al. ............... 429/90 |
| 2008/0016353 | A1 | | 1/2008 | Carro ............................. 713/171 |
| 2008/0129507 | A1 | | 6/2008 | Doan et al. ................. 340/572.1 |
| 2008/0262795 | A1 | * | 10/2008 | Webb et al. ................... 702/184 |
| 2009/0210760 | A1 | * | 8/2009 | Eckelman et al. ............. 714/726 |
| 2009/0248179 | A1 | * | 10/2009 | Kasai et al. ..................... 700/78 |
| 2010/0214069 | A1 | * | 8/2010 | Kong ............................ 340/10.1 |

FOREIGN PATENT DOCUMENTS

| | | | |
|---|---|---|---|
| JP | 2004-364307 | * 12/2004 | |
| WO | WO02086726 | 10/2002 | ............. G06F 11/30 |
| WO | WO2005108744 | 11/2005 | ............. F01B 31/12 |
| WO | WO2006093746 | 9/2006 | |

OTHER PUBLICATIONS

General Electric, website page entitled "System 1® Software", date unknown (copyright 1997-2010?), http://www.ge-energy.com/prod_serv/products/oc/en/system_soft.htm, pp. 1 to 3 of printout.

General Electric, website page entitled "Condition Monitoring Solutions for Reciprocating Compressors", date unknown (copyright 1997-2010?), http://www.ge-energy.com/prod_serv/products/oc/en/bently_nevada/condition_solutions.htm, pp. 1 to 2 of printout.

General Electric, "Petroleum Refining", date unknown (© 2010), http://www.ge-energy.com/prod_serv/products/oc/en/downloads/GEA17985A_8.25x11_LR.pdf, pp. 1-12.

General Electric, website page entitled "Bently Performance™", date unknown (copyright 1997-2010?), http://www.ge-energy.com/prod_serv/products/oc/en/opt_diagsw/bently_performance.htm, pp. 1 to 2 of printout.

General Electric, "Decision Support Studio*/Developer Edition", date unknown (rev. Feb. 2005?), http://www.ge-energy.com/prod_serv/products/oc/en/downloads/decision_support_gea_13912b.pdf, pp. 1-2.

General Electric, "RulePaks", date unknown (rev. Feb. 2005?), http://www.ge-energy.com/prod_serv/products/oc/en/downloads/rulepaks_se_gea_13910b.pdf, pp. 1-2.

General Electric website page entitled "Bently Nevada™ Machinery Diagnostic Services", date unknown (copyright 1997-2010?), http://www.ge-energy.com/prod_serv/products/oc/en/condition_monitoring/machinery_diag.htm, pp. 1-2.

* cited by examiner

|  | Overall Likelihood | Likelihood of Failure mode in Group | Signature |
|---|---|---|---|
| 1. Loss of Performance |  |  |  |
| A. Fouling | 100 | 50 | 501662 |
| B. Corrosion | 100 | 75 | 501662 |
| C. Pluggage | 100 | 50 | 10142 |
| D. Impeller Damage | 100 | 100 | 1409934 |
| E. Surge Damage | 100 | 75 | 625062 |

FIGURE 8A

350 Chart

352 Top Portion

| | Radial Vibration Overall X | Radial Vibration (1X) X | Radial Vibration 1X Phase X | Radial Vibration (2X) X | Radial Vibration Subsynchonous X | Gap Voltage X | Radial Vibration Overall Y | Radial Vibration (1X) Y | Radial Vibration 1X Phase Y | Radial Vibration (2X) Y |
|---|---|---|---|---|---|---|---|---|---|---|
| Position in Signature | 1 | 2 | 3 | 4 | 5 | 6 | 7 | 8 | 9 | 10 |
| Numeric value of position | 2 | 4 | 8 | 16 | 32 | 64 | 128 | 256 | 512 | 1024 |
| 501662 | High = 1 | High = 1 | X = 1 | High = 1 | 0 | 0 | High = 1 | High = 1 | X = 1 | High = 1 |
| 10142 | High = 1 | High = 1 | X = 1 | High = 1 | 0 | 0 | High = 1 | High = 1 | X = 1 | High = 1 |
| 1409934 | High = 1 | High = 1 | 0 | 0 | 0 | 0 | High = 1 | High = 1 | High = 1 | 0 |
| 625062 | High = 1 | High = 1 | 0 | 0 | High = 1 | 0 | 0 | 0 | 0 | 0 |

354 Bottom Portion

| | Radial Vibration Subsynchonous Y | Gap Voltage Y | Elipticity | Eccentricity | Radial Vibration Overall | Radial Vibration (1X) | Radial Vibration 1X Phase | Radial Vibration (2X) | Radial Vibration Subsynchonous | Radial Bearing Temperature |
|---|---|---|---|---|---|---|---|---|---|---|
| Position in Signature | 11 | 12 | 13 | 14 | 15 | 16 | 17 | 18 | 19 | 20 |
| Numeric value of position | 2048 | 4096 | 8192 | 16384 | 32768 | 65536 | 131072 | 262144 | 524288 | 1048576 |
| 501622 | 0 | 0 | X = 1 | 0 | High = 1 | 0 | High = 1 | High = 1 | 0 | 0 |
| 10142 | 0 | 0 | Low = 1 | 0 | 0 | 0 | 0 | 0 | 0 | 0 |
| 1409934 | 0 | 0 | 0 | 0 | High = 1 | High = 1 | 0 | 0 | 0 | 0 |
| 625062 | High = 1 | 0 | 0 | 0 | High = 1 | High = 1 | 0 | 0 | High = 1 | 0 |

FIGURE 8B

FRAMEWORK AND METHOD FOR MONITORING EQUIPMENT

The present application claims priority of U.S. Provisional Patent Application No. 60/944,286 filed 15 Jun. 2007.

CROSS-REFERENCE TO RELATED APPLICATIONS

This application is a national stage entry of international Application No. PCT/US08/67119, filed Jun. 16, 2008, which claims priority, pursuant to 35 U.S.C. §119(e), of U.S. Provisional Application Ser. No. 60/944,286 entitled "REMOTE MONITORING SYSTEMS AND METHODS," filed on Jun. 15, 2007 in the name of James Kong and is hereby incorporated by reference.

BACKGROUND

U.S. Patent Application Publication 2008/0129507 discloses a method for employing radio frequency (RF) identifier (ID) transponder tags (RFID tags) to create a unique identifier, termed an RFID signature, for use within a data processing system with respect to a person or an object. An interrogation signal is transmitted toward a person or an object with which a set of one or more RFID tags are physically associated. A first set of RFID tag identifiers are obtained from an interrogation response signal or signals returned from the set of one or more RFID tags. A mathematical operation is performed on the first set of RFID tag identifiers to generate an RFID signature value, which is employed as an identifier for the person or the object within the data processing system with respect to a transaction that is performed by the data processing system on behalf of the person or the object. U.S. Patent Application Publication 2008/0129507 is herein incorporated by reference in its entirety.

U.S. Patent Application Publication 2008/0016353 discloses a method and system for verifying the authenticity and integrity of files transmitted through a computer network. Authentication information is encoded in the filename of the file. In a preferred embodiment, authentication information is provided by computing a hash value of the file, computing a digital signature of the hash value using a private key, and encoding the digital signature in the filename of the file at a predetermined position or using delimiters, to create a signed filename. Upon reception of a file, the encoded digital signature is extracted from the signed filename. Then, the encoded hash value of the file is recovered using a public key and extracted digital signature, and compared with the hash value computed on the file. If the decoded and computed hash values are identical, the received file is processed as authentic. U.S. Patent Application Publication 2008/0016353 is herein incorporated by reference in its entirety.

SUMMARY

In one aspect, the invention provides a system comprising at least one piece of equipment; a state detector adapted to measure one or more operating parameters of the equipment; and a signature generator adapted to encode a plurality of data streams from the state detector into an operating signature for the equipment.

In another aspect, the invention provides a method comprising identifying a failure mode for a piece of equipment; identifying one or more symptoms of the failure mode; identifying one or more indicators corresponding to the symptoms; identifying an acceptable range for the indicators; and generating an action to take when the indicator is outside the acceptable range.

Other aspects of the invention will be apparent from the following description and the appended claims.

BRIEF DESCRIPTION OF DRAWINGS

FIGS. 8A-8B show an example in accordance with one or more embodiments of the invention.

DETAILED DESCRIPTION

Figure 1:
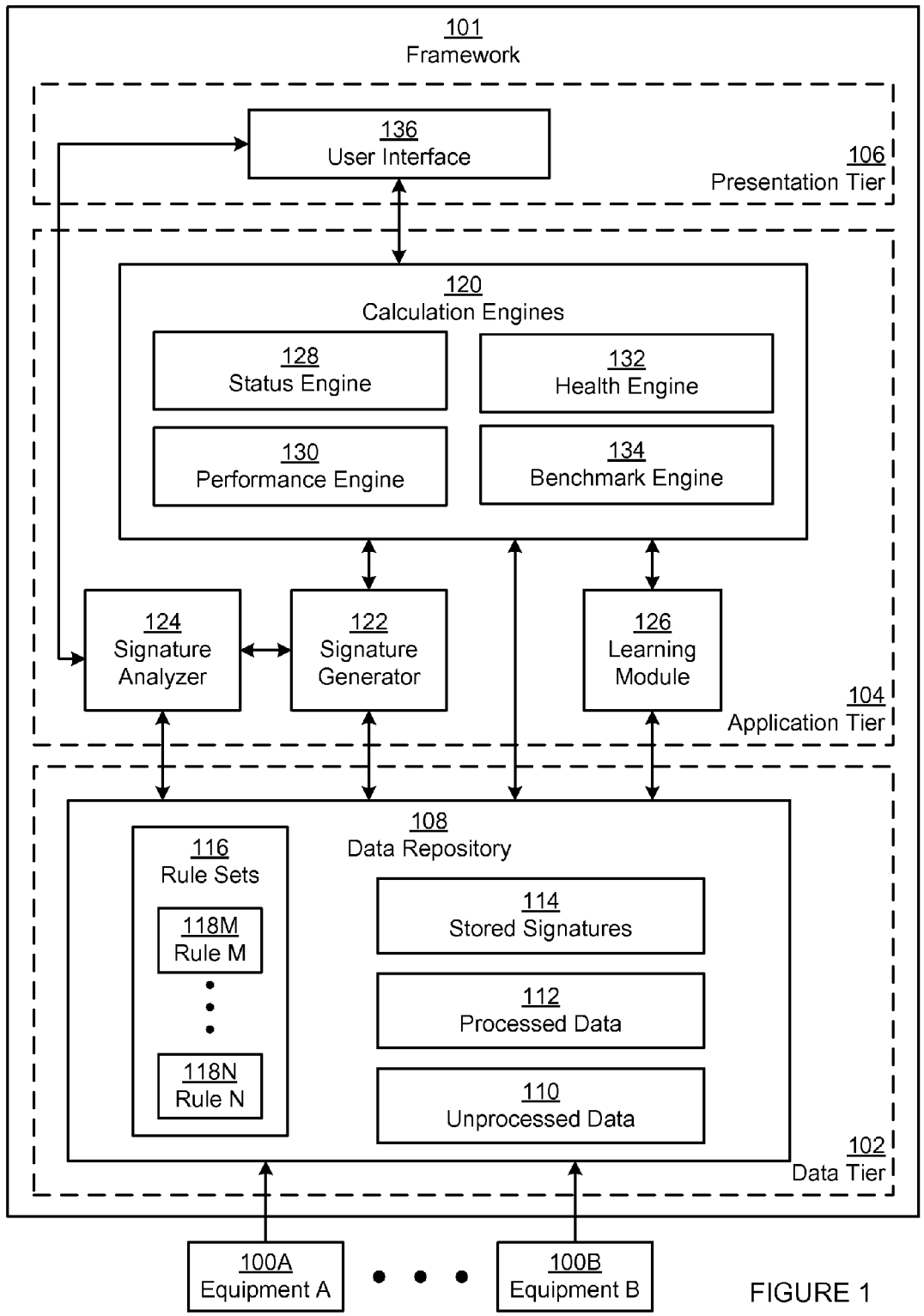
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a framework and method for monitoring equipment. In one or more embodiments of the invention, each piece of equipment has state detectors associated with the equipment. The state detectors may include sensors, one or more individuals viewing the equipment, and other such monitors of the equipment. The state detectors gather unprocessed data that describes the operational conditions of the equipment. The operational conditions may define both conditions internal to the equipment, such as how well the equipment is operating, as well as conditions external to the equipment, such as the environment in which the equipment is operating.

The unprocessed data is analyzed at multiple levels of analysis to provide a complete view of the state of the equipment. The levels of analysis include status analysis, health analysis, performance analysis, and benchmark analysis. The levels of analysis are used to create processed data representing the status of the equipment, the health of the equipment, the performance of the equipment, and the past performance of the equipment.

The processed data and unprocessed data may be encoded to generate a signature. The encoding to create the signature is based on whether the data value being encoded is in a predefined range of values. The ranges are defined based on acceptable limits for the equipment. For example, the range may include a high range, an above normal range, a normal range, a below normal range, and a low range. If value is within the range, then one or more bits are set to indicate that the value is within the range. The bits may then be concatenated to generate the signature. Thus, the single signature provides a synopsis of the state of the equipment at a moment in time. Specifically, a single signature concisely represents which calculated and/or unprocessed data values are within acceptable limits and which data values are outside of acceptable limits.

One or more signatures may be compared with classified signatures in stored rules. A classified signature in a rule defines the state of the equipment when the mechanical health and performance of the equipment deviates from acceptable parameters. A rule defines the actions to perform when the deviation is detected by a generated signature matching the classified signature. For example, the rule may define the urgency of the actions, whom to contact, documents, and other such information. By using signatures in the rules, embodiments of the invention may decrease the time required to detect a failure.

FIG. 1:

FIG. 1 shows a schematic diagram of a system in accordance with one or more embodiments of the invention. As shown in FIG. 1, the system includes equipment (100) and a framework (101). The equipment (100) and the framework (101) are discussed below.

Equipment (100) corresponds to the physical devices that are being monitored. For example, the equipment (100) may include gearboxes, compressors, pumps, lubricating systems, as well as other such equipment. In one or more embodiments of the invention, the equipment includes functionality to perform hydrocarbon extraction related operations. For example, the equipment may be drilling equipment. Further, one piece of equipment may be a component of another piece of equipment. For example, equipment A (100A) may correspond to a compressor while equipment B (100B) corresponds to a bearing in the compressor. In such a scenario, one series of signatures (i.e., signatures generated from data obtained at different moments in time) may represent the compressor with the bearing while another series of signatures represents only the bearing.

In one or more embodiments of the invention, the equipment (100) is monitored by state detectors. Each state detector includes functionality to obtain unprocessed data. The state detector may be a sensor, a person monitoring the equipment, or any other monitoring unit that obtains data about the operation's conditions.

The framework (101) corresponds to a tool for monitoring the equipment in accordance with one or more embodiments of the invention. In one or more embodiments of the invention, the framework is a software application for performing hydrocarbon extraction related operations. The framework includes a data tier (102), an application tier (104), and a presentation tier (106) in accordance with one or more embodiments of the invention. Each of the tiers is discussed below.

The data tier (102) includes functionality to manage the data for the application (104) (discussed below). In one or embodiments of the invention, the data tier includes a data repository (108). A data repository (108) is any type of storage unit and/or device (e.g., a file system, database, collection of tables, or any other storage mechanism) for storing data. Further, the data repository (108) may include multiple different storage units and/or devices. The multiple different storage units and/or devices may or may not be of the same type or located at the same physical site. For example, a portion of the data repository (108) may be on an internal server while another portion is distributed across the Internet. In one or more embodiments of the invention, the data repository (108), or a portion thereof, is secure.

In one or more embodiments of the invention, the data stored in the data repository (108) includes unprocessed data (110), processed data (112), signatures (114), and a rule set (116). The unprocessed data (110) represents operational conditions of the equipment. For example, the unprocessed data (110) may include data values defining temperature, pressure, flow, density, viscosity. In one or more embodiments of the invention, the unprocessed data (110) is data obtained from the state detectors. For the purposes of the description, unprocessed data (110) includes data that is only preprocessed, such as by a state detector.

In one or more embodiments of the invention, processed data (112) includes data calculated from the unprocessed data (110). In one or more embodiments of the invention, the processed data values may be calculated from unprocessed data obtained from one or more state detectors. For example, processed data may include data values defining the changes in temperature, the difference between inlet and outlet pressure, the performance of the equipment, the health of the equipment, and other such data.

In one or more embodiments of the invention, signatures (114) represent the state of the equipment at a moment in time. As discussed above, a signature represents the state of the equipment at a moment in time or within a predefined range of time. Specifically, the signature is bit string having encoded calculated and unprocessed data values. The signature is discussed below and in FIG. 2.

Continuing with FIG. 1, a rule set (116) includes rules (118) for a piece of equipment. A rule (118) defines the type of failure and the actions to perform when a generated signature matches a signature in the rule. Rules (118) are discussed in further detail below and in FIG. 3.

Continuing with FIG. 1, the application tier (104) includes logic for analyzing the data in the data tier (102). The application tier (104) includes calculation engines (120), a signature generator (122), a signature analyzer (124), and a learning module (126). Each of the components of the application tier (104) is discussed below.

The calculation engines (120) include functionality to analyze the calculated and unprocessed data at multiple levels of analysis to provide a complete view of the state of the equipment. The calculation engines (120) include a status engine (128), a performance engine (130), a health engine (132), and a benchmark engine (134). Each of the calculation engines (120) is discussed below.

The status engine (128) includes functionality to perform a first level of monitoring of the equipment. Specifically, the status engine (128) includes functionality to determine whether each component of the equipment (100) is functioning. The status engine (128) may use as input unprocessed data (110) from one or more components within the equipment (100A, 100B) to generate an indication of whether each component of the equipment is functioning. In one or more embodiments of the invention, the status engine (128) includes status rules. The status rules associate a data element with a threshold value and a confidence level. The data element may be unprocessed data from the component of the equipment or a result calculated from unprocessed data. The threshold value defines a value for the data element in which the data element is functioning or not functioning within the confidence level. In one or more embodiments of the invention, the threshold value is defined using historical data. The confidence level defines likelihood that the component is functioning. For example, a positive speed measurement by a piece of equipment may indicate that the compressor is running. However, a pressure ratio below a predefined threshold on a compressor in the equipment may indicate that the equipment is not fully operational.

The performance engine (130) includes functionality to determine whether the equipment is performing as required.

In one or more embodiments of the invention, the performance engine (130) includes functionality to compare the operational conditions of the equipment with theoretical models of the equipment to generate processed data (112). The performance engine may use input data obtained from the unprocessed data (110) and/or the processed data (112) to generate the processed data (112) describing the performance. The processed data (112) generated by the performance engine (130) may include data values defining the deviation of the equipment from the design of the equipment. The following examples are of input data and output data of the performance engine for different types of oilfield equipment. The following are for explanatory purposes only and not intended to limit the scope of the invention. Those skilled in the art will appreciate that additional or fewer input data and output data may exist in each of the examples below without departing from the scope of the invention, and that the invention can be applied to monitor any type of operating equipment.

In a first example, consider the scenario in which the type of equipment is a centrifugal compressor. The input data may include suction pressure, discharge pressure, suction temperature, discharge temperature, flow, flow meter drop in pressure, power, gas composition, compressor curve and reference conditions, and machine parameters, such as impeller diameter and number of impellers. In the first example, the output data of the performance engine (130) monitoring the centrifugal compressor may include head, head deviation from the model, efficiency, efficiency deviation from the model, theoretical flow, theoretical power, power deviation from the model, theoretical discharge temperature, temperature deviation from the model, theoretical interstage pressure, and impeller with corresponding impeller performance.

In a second example, consider the scenario in which the type of equipment is a reciprocating compressor. The input data may include suction pressure, discharge pressure, suction temperature, discharge temperature, flow, flow meter drop in pressure, power, gas composition, compressor mechanical parameters, and loadstep and unloading configuration. In the second example, the output data of the performance engine (130) monitoring the reciprocating compressor may include efficiency, efficiency deviation from the model, theoretical flow, flow deviation from the model, theoretical power, power deviation from the model, theoretical discharge temperature, temperature deviation from the model, theoretical interstage pressure, predicted rod load, and predicted volumetric efficiency.

In a third example, consider the scenario in which the type of equipment is a centrifugal pump. The input data may include suction pressure, discharge pressure, suction temperature, discharge temperature, flow, flow meter drop in pressure, power, liquid properties, pump curve with corresponding reference conditions, and machine parameters, such as impeller diameter and number of impellers. In the third example, the output data of the performance engine (130) monitoring the centrifugal pump may include head, head deviation from the model, efficiency, efficiency deviation from the model, theoretical flow, flow deviation from the model, theoretical power, power deviation from the model, theoretical discharge temperature, temperature deviation from the model, theoretical interstage pressure, and net positive suction head available versus required.

In a fourth example, consider the scenario in which the type of equipment is a gas turbine. The input data may include fuel flow, fuel gas composition, fuel pressure, fuel temperature, ambient air conditions, axial compressor discharge pressure, axial compressor discharge temperature, exhaust temperature, power turbine exhaust temperatures, power, and test curves. In the fourth example, the output data of the performance engine (130) monitoring the gas turbine may include axial compressor efficiency, gas generator turbine efficiency power turbine efficiency, N1/N2 ratio, Iso corrections, air flow prediction, carbon dioxide prediction based on combustion analysis, and overall train efficiency.

Continuing with the calculation engines (120), the health engine (132) includes functionality to monitor health of the equipment. The health of the equipment includes the changes in an equipment's operation over a specified duration of time. The health engine includes functionality to evaluate health indicators of the equipment. A health indicator is unprocessed data (110) and/or processed data (112) that may be a symptom of failing health of the equipment (100). The health engine (132) may use as input design data (e.g., configuration, number of bearings, types of bearings, etc.) and behavioral data (e.g., normal vibration, temperature, clearance, expected flow, expected viscosity, and other such data) of the equipment (100). The output of the health engine (132) includes processed data (112) identifying the change in health of the equipment.

In addition to the functionality discussed above, the health engine (132) may include a pluggable interface for connecting with third party monitors of the equipment. For example, the manufacturer (not shown) of the equipment (100) may have a software tool for monitoring the equipment. The health engine (132) may include functionality to connect to the software tool to provide unprocessed data (110) and processed data (112) for the equipment (100). The health engine (132) may further include functionality to obtain health information describing the health of the equipment (100) from the software tool. The health engine (132) may store the data in the data repository (108).

The benchmark engine (134) includes functionality to compare the operations of the equipment (100) with similarly configured equipment. For example, the benchmark engine (134) may gather information about the percentage of time that the equipment is non-functioning or functioning outside of the acceptable range, the changes in performance of the equipment, the reliability of the equipment, and other such information.

Continuing with the application tier (104), the calculation engines (120) are connected to a signature generator (122), a signature analyzer (124), and a learning module (126) in accordance with one or more embodiments of the invention. A signature generator (122) includes functionality to generate a signature (114) using the unprocessed data (110) and processed data (112).

The signature generator (122) may include an encode key set (not shown) for failure indicators. A failure indicator is a single variable representing a unit of processed data (110) or processed data (112). For example, an encode key set may encode data obtained from a specified state detector while another encode key set encodes processed data (112) generated by the performance engine (130). In the example, one failure indicator is data from the specified state detector while another failure indicator is an identifier of the level of performance of the equipment. A failure group (not shown) is a grouping of related failure indicators. For example, different pieces of equipment may have the same component. In such cases, failure indicators corresponding to unprocessed data and processed data defined for the component are grouped into the same failure group. Thus, each of the different pieces of equipment is associated with the same failure group. Further, by specifying that a component exists in a new piece of equipment, the failure group for the component may be associated with the new piece of equipment.

An encode key set includes one or more encode keys. Each encode key defines a mapping between the possible values of the state detector data and a bit value in the signature. Specifically, the encode key assigns a range of possible values or a discrete group of possible values of the state detector data to a value of a bit in the signature. The encode keys are discussed in further detail below and in FIG. 2.

Continuing with FIG. 1, a signature analyzer (124) includes functionality to compare the generated signatures (114) and analyze the generated signatures. Specifically, the signature analyzer (124) includes functionality to identify when one or more generated signatures matches with classified signatures in the rules (118). The signature analyzer (124) may further include functionality to perform the action and/or generate an alert when a rule (118) is matched, such as control the equipment to perform the action. Alternatively, or additionally, the signature analyzer (124) may include functionality to generate an alert, such as create an auditory alarm, send an email or text message to an operator, display a warning message, or perform any other steps defined by the action.

A learning module (126) includes functionality to create rules (118) in accordance with one or more embodiments of the invention. Specifically, the learning module (126) includes functionality to detect a failure in the equipment (100) and identify the symptoms of the failure that occurred prior to the failure. More specifically, the learning module (126) may identify the state of the equipment leading up to the failure in order to generate a new rule to prevent future failures of the same type.

In one or more embodiments of the invention, the application tier (106) is operatively connected to a presentation tier (106). The presentation tier (106) includes functionality to present the data from the application tier (106) to a user. The presentation tier (106) includes a user interface (136). In one or more embodiments of the invention, the user interface (136) includes functionality to display alerts generated by the signature analyzer (124) and data from the calculation engines (120). In one or more embodiments of the invention, the data from each calculation engine (120) is displayed in a separate window.

For example, the display of data from the status engine (128) may include an indication of each piece of equipment, whether the equipment is operating, and the confidence level. The data may appear as a yellow or green indicator. The yellow indicator indicates to the user that the equipment is not functioning. A green indicator indicates that the equipment is functioning. The display of data may include a display for each piece of equipment (100) as well as a display for each component of a single piece of equipment (100).

The display of data from the performance engine (130) may include graphs that present the calculated performance data. For example, a graph may display head efficiency on the y-axis and inlet flow on the x-axis. Different graphs may be used to present the performance data to the user. The display of data from the health engine (132) may include a chart of the components of the equipment with an indication of the health of the equipment. The display of data from the benchmark engine (134) may include an availability report that charts the percentage of time that the equipment is available.

Those skilled in the art will appreciate that the above is only a few examples of how the data from the application tier (104) may be presented to the user. Other presentations may also be used without departing from the scope of the invention.

Figure 2:
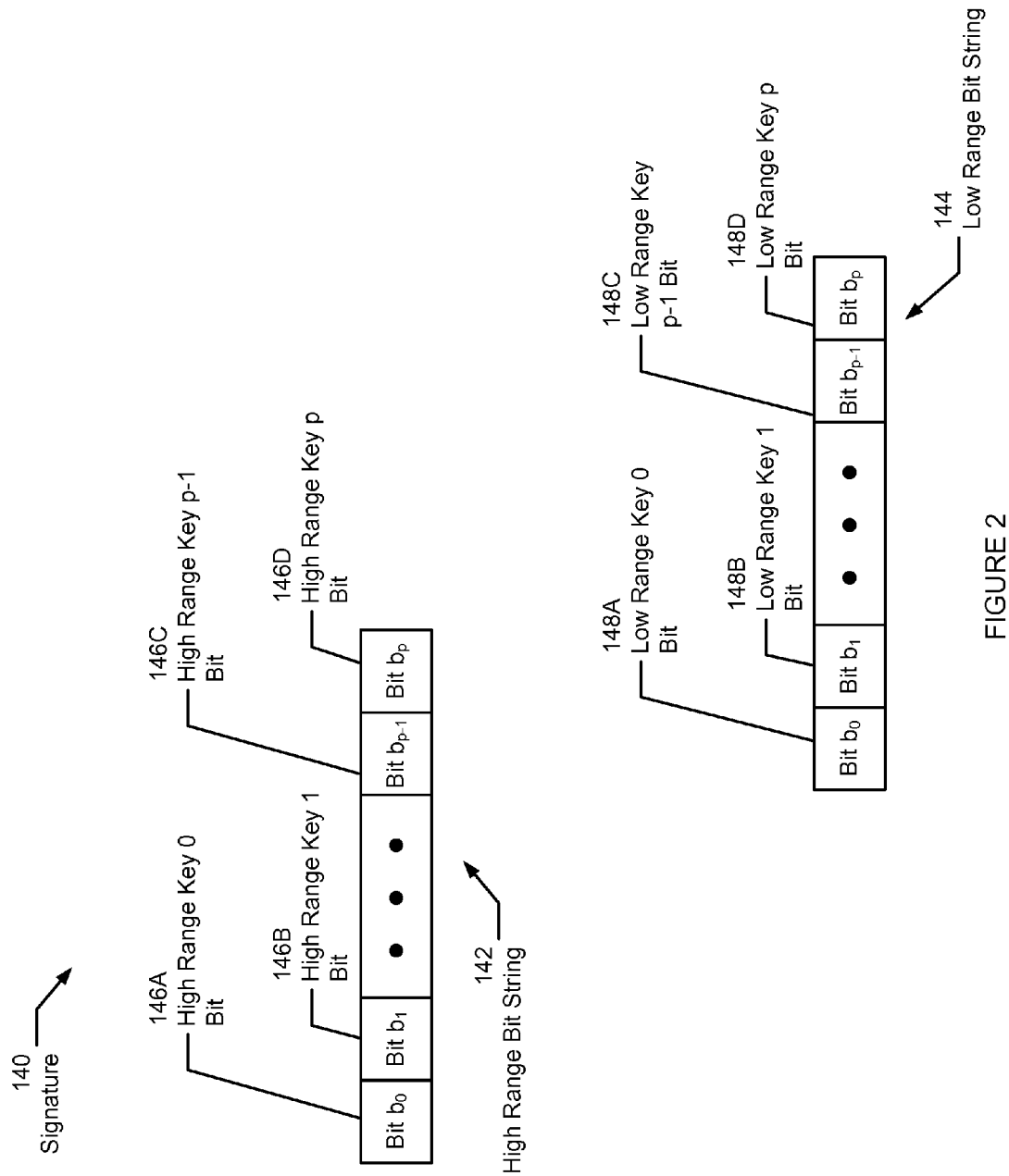
FIG. 2 shows a schematic diagram of a signature in accordance with one or more embodiments of the invention.

FIG. 2:

FIG. 2 shows an example signature (140) in accordance with one or more embodiments of the invention. The following is for exemplary purposes only and not intended to limit the scope of the invention. In one or more embodiments of the invention, the data type of the signature (140) is an unsigned Big Int. A Big Ints has sixty-four bits that are stored as a single block of data. An unsigned Big Int represents integer values of 0 to $2^{64}$-1. In one or more embodiments of the invention, the signature (140) is a concatenation of four Big Ints. Those skilled in the art will appreciate that different sizes of the signature and different data types may be used without departing from the scope of the invention.

In FIG. 2, the signature (140) includes bit strings for encoding a high range, a normal range, and a low range. Specifically, when a state detector data value is in the high range, a bit may be set to "1" in the high range bit string (142) with the corresponding bit set to "0" in the low range bit string. When the state detector data value is in the low range, a bit may be set to "1" in the low range bit string (144) with the corresponding bit set to "0" in the high range bit string. A state detector data value that is in the normal range has the bit set to "0" in the high range bit string (142) and "0" in the low range bit string (144).

As discussed above, the encoding of state detector data values is performed by an encode key that maps the value to bits in the bit string. Each encode key in the encode key set has a corresponding position for a bit (146, 148) in the signature (140) in the corresponding range. For example, high range keys have corresponding high range key bits (146) in the high range bit string (142) while low range keys have corresponding bits (148) in the low range bit string (144). For example, state detector data encoded by encode key set 1 is encoded in high range key 1 bit (146B) and in low range key 1 bit (148B). Thus, two bits in the signature (140) are used to represent the three possible ranges.

Encode keys may be defined as a single numeric value and a bit position. In particular, the high range encode key may be defined by the high number in which all values above the high number are in the high range. Conversely, the low range encode key may be defined by the low number in which all values below the low number are in the low range. For example, state detector data values above the value of the high range key are in the high range and therefore are encoded as a "1" in the high range key bit (146). Similarly, state detector data values below the low range key are in the low range and therefore are encoded as a "1" in the low range key bit (148). State detector data values that are lower than the high range key and higher than the low range key are in the acceptable range and may be encoded as a "0" in the high range key bit (146) and as a "0" in the low range key bit (148).

For the following example, consider the scenario in which the high range is above 295, the low range is below 225, and the normal range is between 225 and 295. In the example, a high range key may define that state detector data having a value above 295 is encoded as a "1" for the high range bit. Further, in the example, a low range key may define that state detector data having a value below 225 is encoded as a "1" for the low range bit. Thus, in the example, a state detector data value of 312 is assigned a "1" for the high range bit and a "0" for the low range bit.

As discussed above, FIG. 2 is only an example of one possible format for the signature. Alternative variations for the format of the signature may be used. Below is a discussion of some of the different variations that may not be represented directly in FIG. 2.

In a first variation, a different encoding than discussed above may be used. Specifically, a value of "0" may be used to represent when the state detector data value is in the range specified by the bit. For example, rather than using a value of "1", a value of "0" in the high range key bit may represent when the state detector data value is above the high range key.

In another variation, although FIG. 2 shows only two bit strings, additional bit strings may be used to represent additional ranges. For example, consider the scenario in which the data is to be encoded into a low range, a below normal range, a normal range, an above normal range, and a high range. In the example, the five different ranges may be represented by three or four bits depending on the encoding. For example, using the encoding discussed above, four bits may be used. Each of the four bits represents whether the state detector data value is one of the four abnormal ranges. Alternatively, three bits may be used to represent the five ranges. In such an alternative, more than one of the three bits may be "1" in the generated signature. For example, the following encoding may be used for the state detector data value: "000" represents normal range, "001" represents below normal range, "011" represents low range, "100" represents above normal range, and "110" represents high range.

In another variation, rather than identifying whether the state detector data value is within a range of values, an encode keys may be used to specify when the value is a member of a discrete set of values. In such scenario, rather than having a high range key bit and a low range key bit, the signature may have a single bit that represents whether the value of the state detector data is in the set. For example, consider the scenario in which the discrete set of values is X1, X2, X3, X4, and X5. A value of "1" may be used to represent when the value of the state detector data is either X1, X2, X3, X4, or X5 while a value of "0" may be used to represent when the value of the state detector data is not X1, X2, X3, X4, or X5. Thus, in the example, X3 maps to "1" while X7 maps to "0" as defined by the encode key set.

In another variation of FIG. 2, the number of encode keys in the encode key set may not be uniform. Thus, the number of bits in the high range bit string may be different from the number of bits in the low range bit string. For example, consider the scenario in which a first portion of the state detector data have four corresponding encode keys (e.g., to represent a low range, a below normal range, a normal range, an above normal range, and a high range), a second portion has two corresponding encode keys (e.g., to represent a low range, a normal range, and a high range), and a last portion have a single encode key (e.g., to represent when the value of the state detector data is in the set represented by the encode key). In the example scenario, the signature may have five bit strings (e.g., a low range bit string, a below normal range bit string, an above normal bit string, a high range bit string, and a single set bit string). The low range bit string and the high range bit string may have bits for both the first portion and the second portion of the state detector data. The below normal bit string and above normal bit string may have bits for only the second portion of state detector data. The single set bit string may have bits for the last portion of state detector data.

In another variation, virtually any configuration of bits in the signature may be used. For example, although FIG. 2 shows having a high range bit string and a low range bit string, bit positions for encode keys in the same encode key set may be adjacent. As an example, bits that encode temperature may be adjacent rather than in separate bit strings.

Further, although FIG. 2 shows the bit strings as separated, the bit strings may be concatenated to form the signature. Specifically, bit $b_P$ in the high range bit string (142) may immediately precede bit $b_0$ in the low range bit string (144). Thus, the signature may be the concatenation of the bit strings.

Further, although FIG. 2 shows the signature as a bit string, those skilled in the art will appreciate that the signature, when presented to the user, may be the numeric value of the bit string. Specifically, each bit string has a unique numeric value for the data type. For example, the bit string "00000110" in the unsigned byte data type represents the value of six.

Those skilled in the art will appreciate that the above is only a few of the possible variations of the signature. Different variations maybe used without departing from the scope of the invention.

Figure 3:
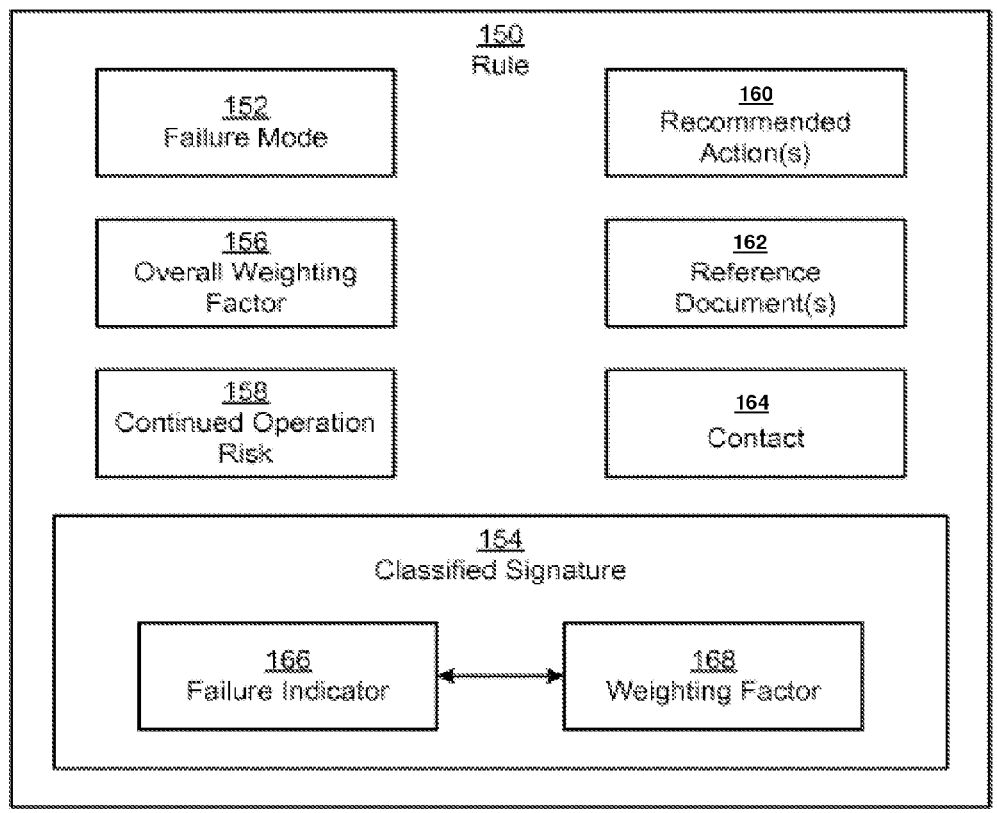
FIG. 3 shows a schematic diagram of a rule in accordance with one or more embodiments of the invention.

FIG. 3:

FIG. 3 shows a schematic diagram of a rule (150) in accordance with one or more embodiments of the invention. As shown in FIG. 3, a rule (150) includes a description of a failure mode (152), a classified signature (154), an overall weighting factor (156), a continued operation risk (158), recommended actions (160), reference documents (162), and a contact (164). Each of the components of the rule (150) is discussed below.

A failure mode (152) is an actual mode of equipment failure. For example, a failure mode (152) may be centrifugal compressor fouling, driver degradation, balance piston wear, labyrinth wear, and other such failures.

A classified signature (154) is a signature that is associated with the failure mode. Specifically, the classified signature (154) defines failure indicators (166) that are symptoms of the failure mode. When the failure indicators (166) are outside of the acceptable range, then an impending or existing failure corresponding to the failure mode (152) is detected. For example, a failure corresponding to centrifugal compressor fouling has symptoms of a loss in compressor efficiency, compressor head, increased thrust bearing temperature, increased radial vibration, and increased discharged temperature. In the example, the classified signature corresponding to centrifugal compressor fouling failure mode has failure indicators indicating a compressor efficiency value below an acceptable range, the existence of compressor head, a thrust bearing temperature above an acceptable range, a radial vibration above an acceptable range, and a discharged temperature above an acceptable range.

Each of the failure indicators in the classified signature may be associated with a weighting factor (168). The weighting factor (168) defines the likelihood of the failure mode if the failure indicator is in an unacceptable range. In one or more embodiments of the invention, the weighting factor (168) of 0% indicates that the failure indicator in the unacceptable range is not an indicator of the failure mode, 25% indicates that the failure indicator in the unacceptable range usually does not occur when the failure mode exists, 50% indicates that the failure indicator in the unacceptable range occurs half of the time in which the failure mode exists, 75% indicates that the failure indicator in the unacceptable range usually, but not all of the time, occurs when the failure mode exists, and 100% indicates that the failure indicator must be in the unacceptable range for the failure mode to exist. For example, a centrifugal compressor fouling failure mode typically is evident by increased thrust vibration. However, centrifugal compressor fouling failure mode may exist without having increased thrust vibration. Thus, the weighting factor for increased thrust vibration is less than 100%, and identifies the percentages of centrifugal compressor fouling failures that have increased thrust vibration.

In one or more embodiments of the invention, the overall weighting factor (156) identifies the probability that the failure mode (152) is present. Specifically, the overall weighting factor (156) defines the likelihood of the specified failure mode (152). For example, in clean gas service, a failure mode corresponding to corrosion of the impeller is unlikely, and, therefore, may have a low overall weighting factor. In contrast, in the example, fouling or labyrinth wear is likely, and, therefore, has a high overall weighting factor.

Continued operation risk (158) defines the risk of the equipment continuing execution without correcting the failure in accordance with one or more embodiments of the invention. For example, the continued operation risks (158) may identify additional failure modes that may result by not correcting the failure. The continued operation risks (158) may also identify the likelihood that the additional failure modes will occur.

Recommended action(s) (162) define the course of actions that should be performed in order to recover from the failure mode (152) or prevent failure associated with the failure mode (152) from occurring. For example, the recommended action(s) may be to replace a component of the equipment, modify the operations of the equipment (e.g., increase or decrease pressure, open a valve), shut down the equipment, and perform any other failure recovery or prevention action.

The reference document(s) (164) defines documents that may be accessed to learn about the failure mode (152) and recovering from the failure mode (152). For example, the reference document(s) may include owner's manuals, repair manuals, operations manuals, and other such documents.

The contact (164) is the individual to contact when the failure mode is present. The contact (164) may include the mode for contacting the individual, such as email, phone, text or other such modes of contact.

In one or more embodiments of the invention, the framework may also define a rule set for the operating envelope of the equipment. The operating envelope is the preferred performance level for operating the equipment. Specifically, the operating envelope is the performance level that maximizes life of the equipment and prevents operations induced failures. The operating envelope rule set includes rules which define how to detect and how to correct when the equipment is operating outside of the operating envelope. The rules for the operating envelope of the equipment may include identification of the operating envelope mode, a classified signature, continued operation risk, recommended action, reference documents, and contact. The operating envelope mode identifies the operational conditions of the equipment that is outside of the operating envelope. Specifically, classified signatures in the operating envelope rules define the operating envelope indicators. The operating envelope indicators identify when a component of the equipment is outside of the operating envelope. For example, an operating envelope indicator may identify when the wear of a component is greater than a threshold.

FIGS. 4-7:

FIGS. 4-7 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Figure 4:
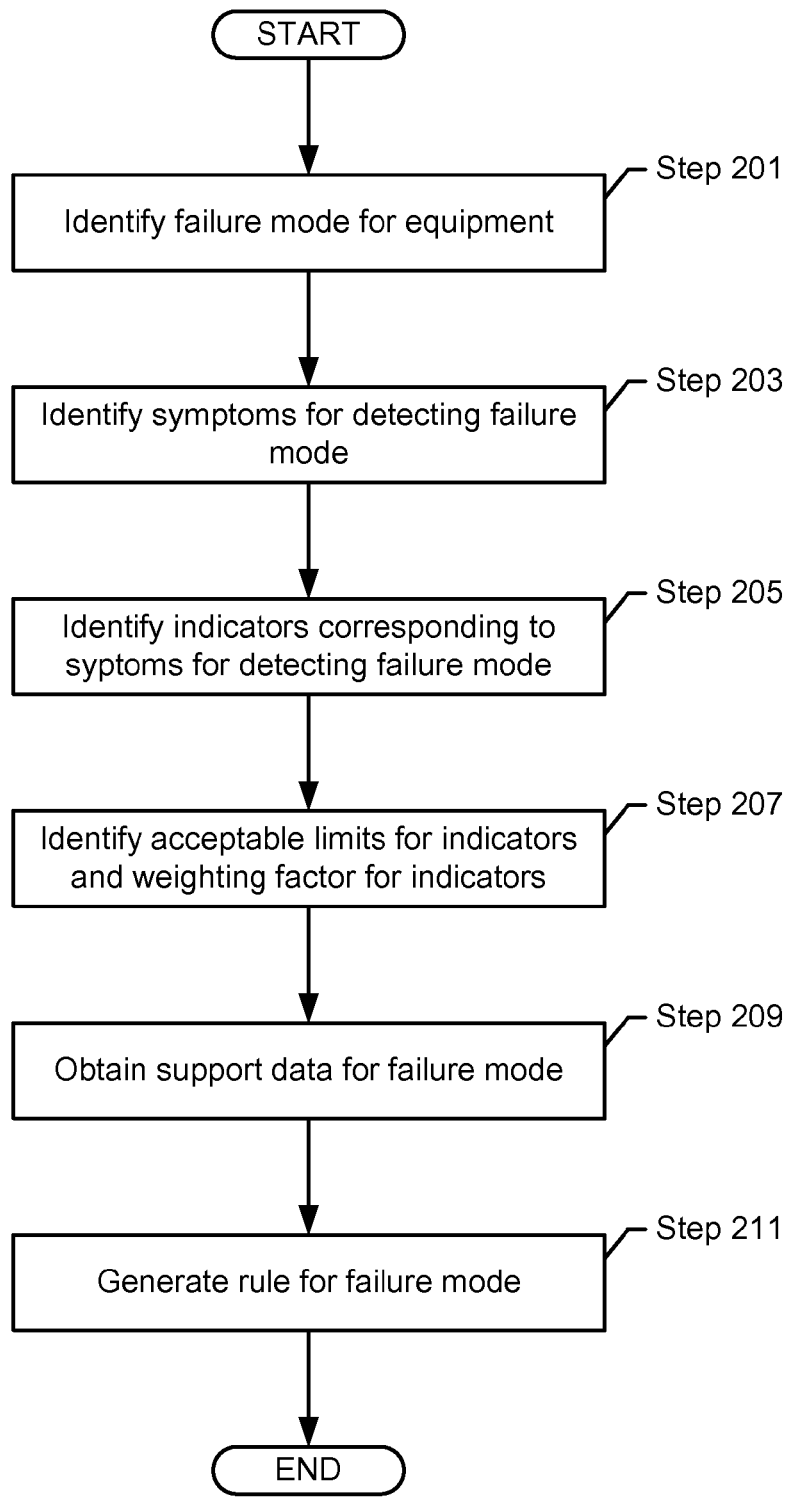
FIGS. 4-7 show flowcharts in accordance with one or more embodiments of the invention.

FIG. 4 shows a flowchart for generating a rule in accordance with one or more embodiments of the invention. In step 201, a failure mode of the equipment is identified. The failure mode may be identified using, for example, manuals associated with the equipment, experience with the type of equipment, and historical data about how the type of equipment has failed.

In step 203, the symptoms for detecting the failure mode are identified. In one or more embodiments of the invention, the symptoms are unprocessed or processed data that contribute to the failure mode or may be used to detect an approaching or existing failure associated with the failure mode. Identifying the symptoms may be performed from using a knowledge based (e.g., stored historical data) and/or experience with the equipment. In step 205, indicators corresponding to the symptoms for detecting the failure mode are identified.

In step 207, the acceptable limits for the indicators and the weighting factors for each indicator identified in Step 205. The acceptable limits for each indicator may be obtained from a knowledge base, experience with the equipment, manufacturer's guidelines, and/or testing. For each indicator, the percentages of failures corresponding to the failure mode in which the indicator is not in the acceptable limits is identified in accordance with one or more embodiments of the invention. The percentage may be used to identify the weighting factor. The acceptable limits and the weighting factor may be also used to generate a classified signature for the rule.

In step 209, support data for the failure mode is obtained. Specifically, the overall weighting factor for the failure, recommended actions, contact, continued operation risk, and reference documents are identified.

In step 211, a rule for the failure mode is generated. In one or more embodiments of the invention, the rule is generated by adding the failure mode, the support data, the classified signature, and the support data to an extensible markup language (XML) document, in a spreadsheet, to a database, and/or to any other data repository.

In one or more embodiments of the invention, steps 203-211 may be repeated for each failure mode identified for the equipment. In one or more embodiments of the invention, rather than performing the steps discussed above, if the equipment has components which are used in other types of equipment, then the failure groups for the components may be obtained from the rule sets associated with the other type of equipment. Specifically, the rule set for the equipment may link to or copy rules defined to detect failures for the common components. Thus, the use of failure groups simplifies the amount of operations to perform to identify the failure modes and create a rule set for the equipment.

Figure 5:
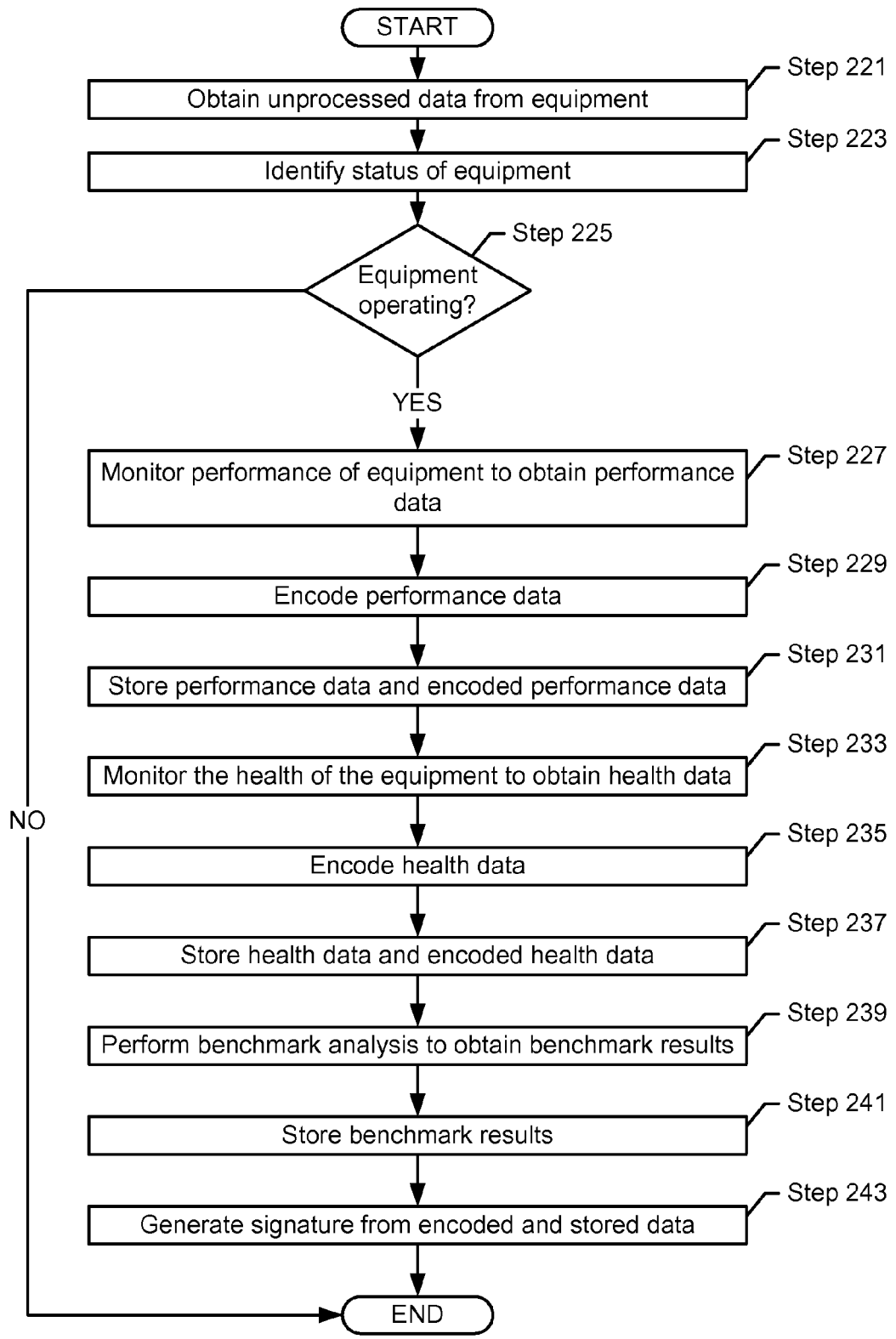

FIG. 5 shows a flowchart for monitoring the equipment in accordance with one or more embodiments of the invention. In step 221, unprocessed data is obtained from the equipment. Specifically, data is gathered from each state detector on the equipment. The data may be gathered in discrete time steps or continually gathered. Further, different state detectors may or may not send unprocessed data to the framework at the same time. In one or more embodiments of the invention, the unprocessed data is stored in the data repository.

In step 223, the status of the equipment is identified. Specifically, a preliminary analysis is performed on the unprocessed data to determine whether the equipment is functioning. The type of preliminary analysis performed may be dependent on the equipment.

In step 225, a determination is made whether the equipment is operating. If the equipment is not operating, then further monitoring of the equipment may or may not be performed. Specifically, if the equipment is not operating, then the equipment may be repaired and/or restarted.

If the equipment is operating, then the performance of the equipment is monitored to obtain performance data (Step 227). In one or more embodiments of the invention, identifying the performance of the equipment is performed by obtaining a performance model for the equipment. Data in the performance model is compared with the unprocessed data. In order to compare the data, calculations may be performance on the unprocessed data. The type of calculations performed is equipment dependent in accordance with one or more embodiments of the invention.

In step 229, the performance data is encoded. Specifically, the failure indicators from the performance data are accessed. Encode keys are used on each failure indicator to determine whether the value of the failure indicator is in the acceptable range. The performance data is encoded based on the determination.

In step 231, the performance stated and the encoded performance data is stored in accordance with one or more embodiments of the invention. By storing both the performance data and the encoded performance data, historical analysis may be performed on the data to create additional rules and monitor the framework.

In step 233, the health of the equipment is monitored to obtain health data. Monitoring the health data may be performed by identifying trends in the operations of the equipment. The type of monitoring may be based on experience with the specific type of equipment and manufacturer's guidelines for the equipment.

In step 235, the health data is encoded. Encoding the health data may be performed in a manner similar to encoding the performance data as discussed above. In step 237, the health data and the encoded health data are stored.

In step 239, benchmark analysis is performed to obtain benchmark results. In one or more embodiments of the invention, the benchmark analysis is performed by identifying a starting time and an ending time for performing the benchmark analysis. Further, the size of the time unit is identified. For each time unit between the starting time and the ending time, the availability of the equipment, and the performance of the equipment, is identified to obtain benchmark results. Other benchmark analysis may be performed without departing from the scope of the invention. In step 241, the benchmark results are stored.

In step 243, a signature is generated from the encoded data and the stored data. In one or more embodiments of the invention, the generated signature is stored in the data repository. The signature may be generated by accessing the encoded data and storing the encoded data in the position of the signature defined by the encode keys.

Although not shown in FIG. 5, the status data, performance data, health data, and benchmark results may be displayed for the user. Specifically, in one or more embodiments of the invention, the user may request any of the aforementioned data using the user interface.

Figure 6:
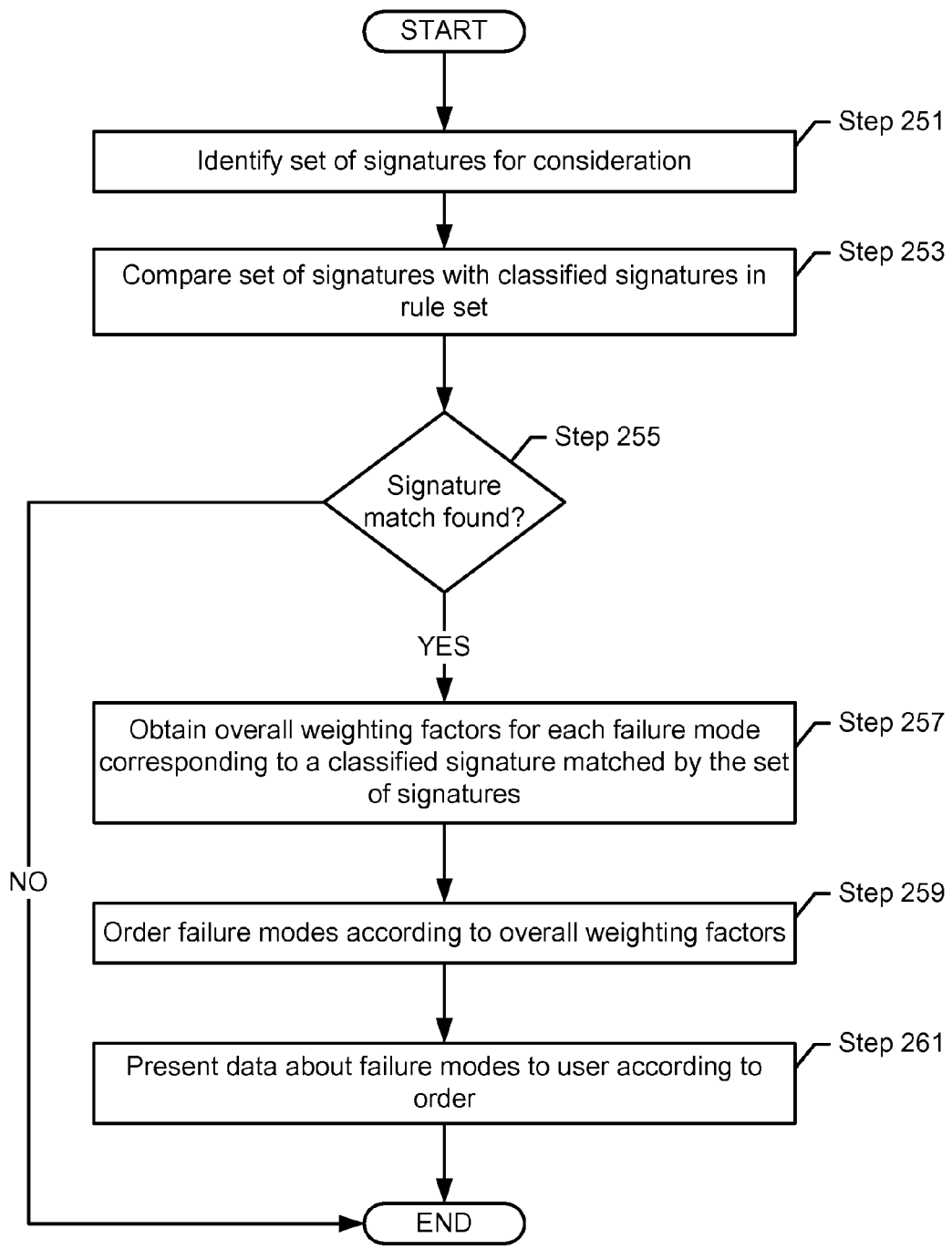

FIG. 6 shows a flowchart for determining whether a generated signature matches one or more classified signatures in a rule. In step 251, a set of signatures for consideration is identified. Specifically, the number of previously generated signatures to analyze may be identified. The rules may require that the classified signature matches at least five of the previous ten signatures in order to detect the failure. In the example, the set of signatures obtained include the previous ten signatures generated.

In step 253, the set of signatures are compared with the classified signatures in the rule set. Comparing two signatures may be performed using any method known in the art for comparing two variables of the same data type. Further, comparing the generated signature with the classified signature may require obtaining the weighting factor for each failure indicator. The weighting factor may be used to specify the match likelihood. The match likelihood defines the number of failure indicators not matched by the generated signature with the weighting factor. For example, the match likelihood reflects when a failure indicator having corresponding weighting factor of 75% is not matched by the generated signature.

In step 255, a determination is made whether a signature match is found. If a signature match is not found then no failure is detected and the method may end. If a signature match is found, then the failure modes having the matching signature are identified.

In step 257, the overall weighting factor for each failure mode corresponding to a classified signature matched by the set of signatures is identified. In step 259, the failure modes are ordered according to the overall weighting factor. The failure modes may also be ordered according to the match likelihood discussed above and in Step 253.

In step 261, data about the failure modes are presented to the user according to the order. Specifically, an ordered list of the failure modes that may be present is presented to the user. The presentation may include support data for each of the failure modes. For example, the presentation may identify which failure modes are present, which indicators are in the unacceptable range, how long the parameters are in unacceptable range, financial and safety risk of cascading failures caused by the failure mode, and the support data in the rule.

In one or more embodiments of the invention, the framework may further access the recommended actions and control the equipment to perform the actions. For example, the framework may automatically shut down the equipment, adjust valves, and perform other such functions. Further, in one or more embodiments of the invention, the framework may transmit an alert to the contact with an identification of the failure mode.

Figure 7:
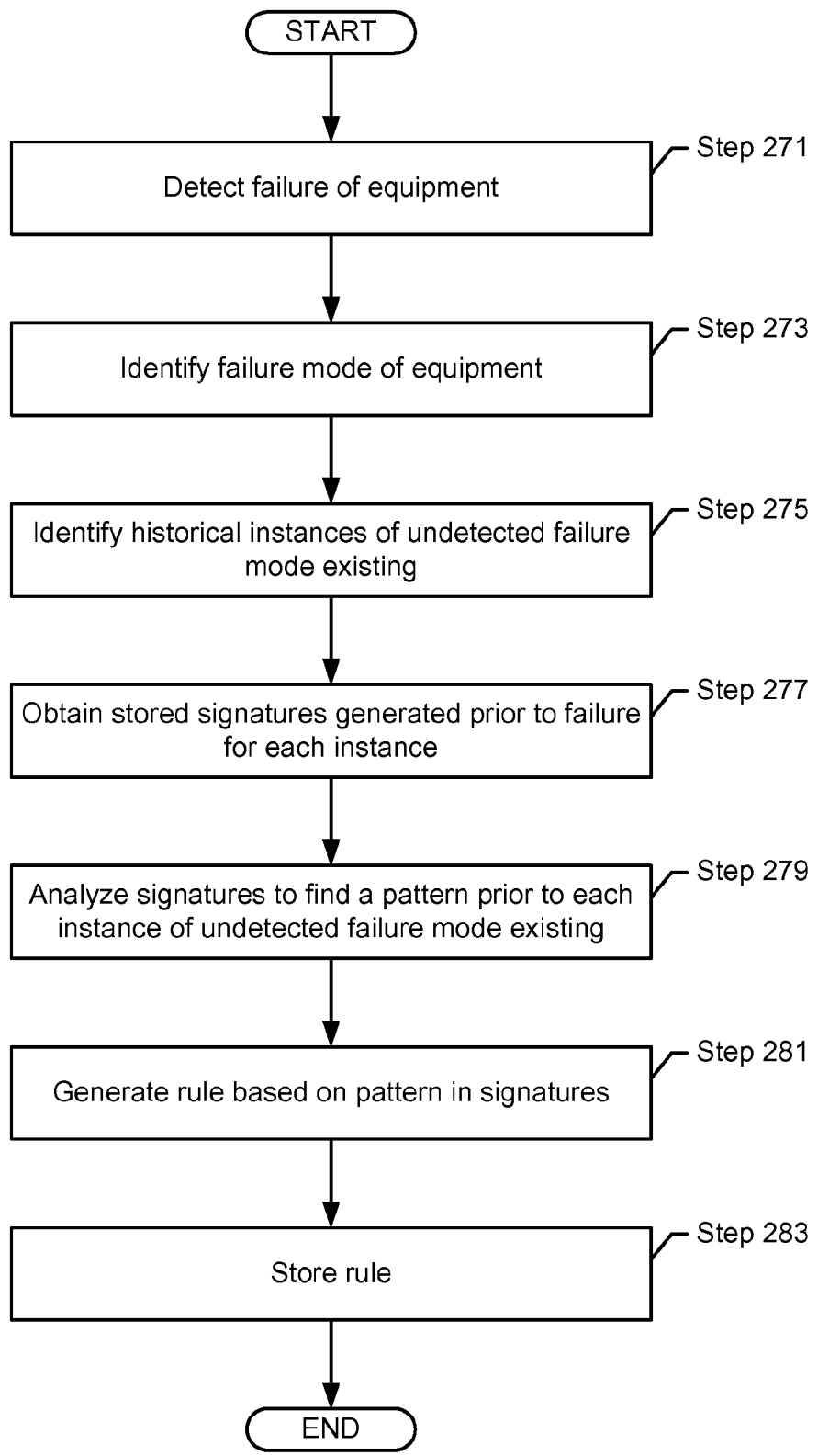

Although not shown in FIG. 7, the method described in FIG. 7 may be similarly used to identify operating envelope violations. Specifically, generated signatures may be similarly compared with the operating envelope rules. The presentation of operating envelope mode having a classified signature matching the generated signature may include an identification of which indicators are outside of the operating envelope, how long the indicators have been outside of the operating envelope, whether the indicators will continue to degrade farther outside of the operating envelope, and support data.

FIG. 7 shows a flowchart for creating a rule in accordance with one or more embodiments of the invention. In step 271, failure of the equipment is detected. In one or more embodiments of the invention, the failure is not detected by a classified signature. For example, the failure may be detected by a user.

In step 273, the failure mode of the equipment is identified. Specifically, the type of the failure is identified. In step 275, historical instances of the undetected failure mode existing are identified. The data repository may be accessed to identify historical instances of the failure of the same failure mode. The historical instances accessed may or may not be from the same piece of equipment. For example, the historical instances may be obtained from different pieces of equipment of the same type of equipment at different geographic locations.

In step 277, stored signatures generated prior to the failure for each historical instance are obtained. The obtained historical signatures are analyzed to find a pattern prior to each instance of undetected failure mode existing (Step 279). Specifically, each series of signatures is compared with other series of signatures to identify potential patterns of indicators that were in the unacceptable range prior to the failure. Also, at this stage, a weighting factor may be associated with each identified signature.

In step 281, a rule is generated based on the pattern in the signatures. Specifically, a new classified signature is defined that includes the failure indicators identified in the pattern and the weighting factor for each failure indicator. Further, support data about the failure is defined. The support data may be based on the experience with the failure mode in the current instance of the failure and the historical instances of the failure. The classified signature, failure mode, and support data are combined to generate a rule. The rule may be stored in the rule set to detect future failures corresponding to the failure mode.

FIGS. 8A-8B:

FIGS. 8A-8B shows an example rule set in accordance with one or more embodiments of the invention. The following example is for explanatory purposes only and not intended to limit the scope of the invention. FIGS. 8A-8B show an example rule set for a drive end bearing in accordance with one or more embodiments of the invention.

FIG. 8A shows different failure modes of a drive end bearing that may result in a loss of performance. As shown column 1 (302), the rule set (300) defines a loss of performance (310) as caused by the following failure modes: fouling (312), corrosion (314), pluggage (316), impeller damage (318), and surge damage (320). Each of the failure modes is associated with a rule associated with the failure mode. The rule is shown by the row of the failure mode.

As shown in the second column (304), the existence of any of the failure modes in the example has a 100% overall likelihood of causing a loss of performance. Specifically, the existence of any of the failure modes in the example will cause a loss of the performance. Further, as shown by the third column (316), each failure mode has a different likelihood of occurring. Specifically, each rule includes a definition of the likelihood that the failure mode will occur in the group of failure modes. For example, the possibility of fouling occurring is only 50% while the possibility of impeller damage occurring is 100%. Each rule further includes a signature in the fourth column (308). The signature associated with the rule defines the failure indicators which identify the failure mode. As shown in the example, two failure modes (e.g., fouling (312), corrosion (314)) may have the same signature. However, fouling (312) has a 50% likelihood of occurring in the group and corrosion (314) has a 75% likelihood of occurring. Thus, if a signature is generated that matches the signature for fouling (312) and corrosion (314), then the user may be presented with both failure modes with an indication that corrosion (314) is more likely than fouling (312).

FIG. 8B shows a chart (350) of how each signature in FIG. 8A is generated by the failure indicators. The chart shown in FIG. 8B is divided into two portions due to page size constraints. The top portion (352) of the chart shows the first 10 bits of the signature and the bottom portion (354) of the chart shows the last 20 bits of the signature. In the example, the entire signature is concatenated to produce the numeric value of the signature shown in first column (356). As shown in FIG. 8B, the failure indicators (358) include radial vibration in the "X" direction, in the "Y" direction, and overall, elipticity, eccentricity, and radial bearing temperature. For the example shown in FIG. 8B, consider the scenario in which the value of a failure indicator is encoded as a "1" when the value is in an unacceptable range (e.g., high, low, or does not matter (i.e., denoted as "X")) and is encoded as a "0" when the value of the failure indicator is in the acceptable range.

Each of the failure indicators (358) has a corresponding bit position in the signature. The first row (360) shows the corresponding bit position for each failure indicator in the signature. The second row (362) shows the numeric value of the bit position. Specifically, the values in second row (362) are equal to two to the power of the value of the bit position (i.e., $2^{value\ of\ bit\ position}$). Thus, a signature has two formats, a numeric value and a unique bit string that results in the numeric value.

Consider the example in which the following failure indicators of the drive end bearing have values in the high range: radial vibration overall X, radial vibration (1x) X, radial vibration subsynchronous X, radial vibration overall Y, radial vibration (1x) Y, radial vibration subsynchronous Y, radial vibration overall, radial vibration (1x), and radial vibration subsynchronous. The corresponding bit positions associated with each of the aforementioned failure indicators with values in the high range are encoded as a "1". The remaining failure indicators are encoded as a "0". The following bit string format of the signature is produced 1100101100100011 0010 as shown in the seventh row (364). The numeric format of the signature is 625062. Turning to FIG. 8A, the signature, 625062, indicates that there is a 75% likelihood that the drive end bearing has surge damage (320) which is resulting in the loss of performance. By correcting the surge damage, the performance of the drive end bearing may improve.

Figure 9:
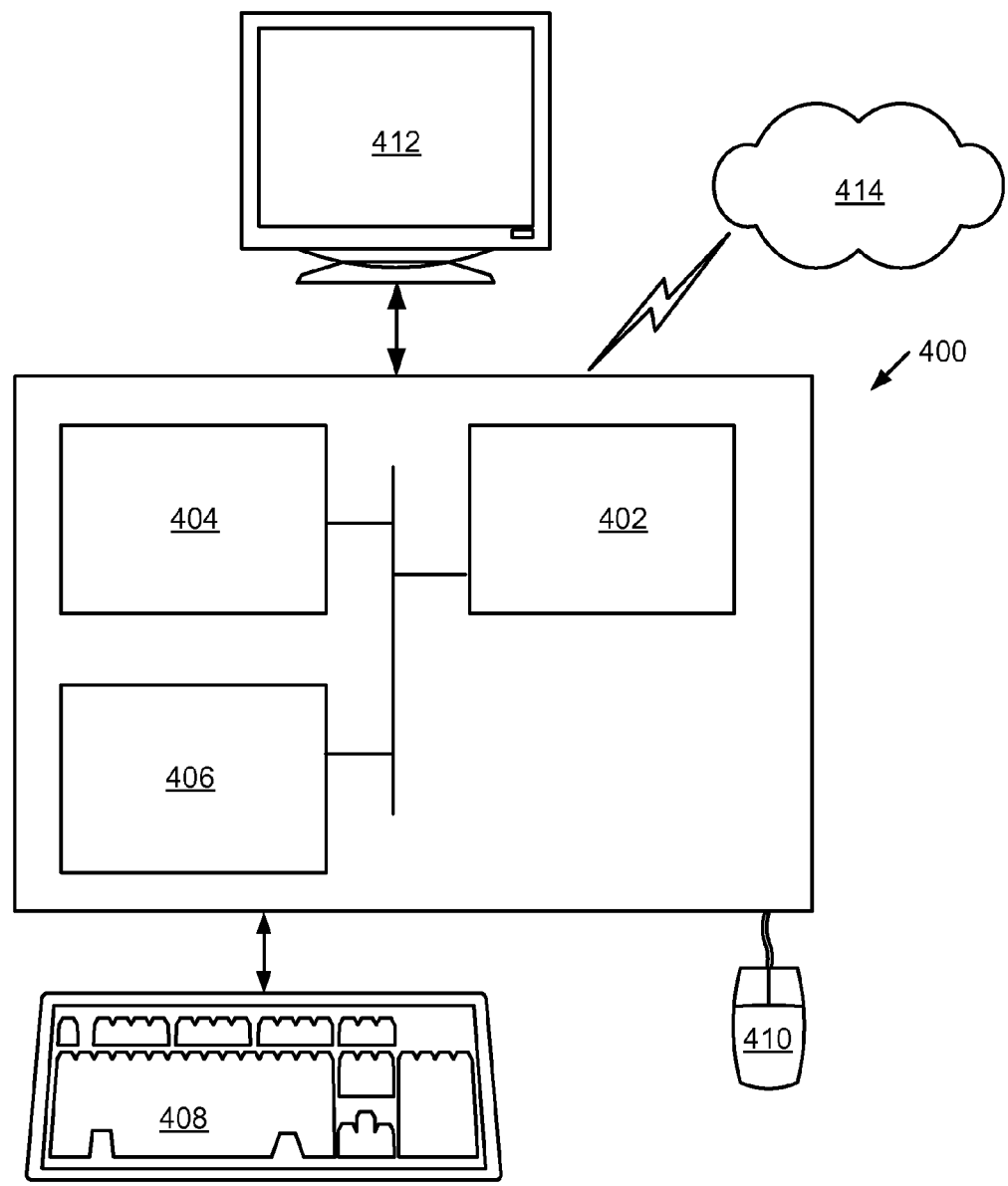
FIG. 9 shows a computer system in accordance with one or more embodiments of the invention.

FIG. 9:

Embodiments of the invention may be implemented on virtually any type of computer regardless of the platform being used. For example, as shown in FIG. 9, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., calculation engines, data repository, signature analyzer, signature generator, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Illustrative Embodiments:

In one embodiment, there is disclosed a system comprising at least one piece of equipment; a state detector adapted to measure one or more operating parameters of the equipment; and a signature generator adapted to encode a plurality of data streams from the state detector into an operating signature for the equipment. In some embodiments, the system also includes a rule set containing a plurality of rules that correspond to actions to be taken in response to known signatures of the equipment. In some embodiments, the system also includes a signature analyzer adapted to compare a signature from the signature generator with a known signature from the rule set. In some embodiments, the system also includes a user interface adapted to output a recommended action when a signature from the signature generator matches a known signature from the rule set. In some embodiments, the signature generator produces a signature comprising at least two of a high, normal, and low range bit string. In some embodiments, the system also includes the signature generator converts the bit string to a number. In some embodiments, the system also includes a status engine adapted to determine if the equipment is operating. In some embodiments, the system also includes a performance engine adapted to determine if the equipment is performing according to a model of the equipment or to a design of the equipment. In some embodiments, the system also includes a health engine adapted to determine how the equipment's operation is changing over time. In some embodiments, the system also includes a benchmark engine adapted to compare the operation of the equipment with other similar equipment. In some embodiments, the system also includes a learning module adapted to detect a failure, identify one or more symptoms of the failure, assign a new signature associated with the failure and the symptoms, and assigning one or more actions to take in response to the signature.

In one embodiment, there is disclosed a method comprising identifying a failure mode for a piece of equipment; identifying one or more symptoms of the failure mode; identifying one or more indicators corresponding to the symptoms; identifying an acceptable range for the indicators; and generating an action to take when the indicator is outside the acceptable range. In some embodiments, the method also includes monitoring the equipment to determine if the indicators are within the acceptable range. In some embodiments, the method also includes taking an action when an indicator is outside the acceptable range. In some embodiments, the method also includes identifying at least two indicators outside of their acceptable range, and ordering the actions to take in order of decreasing severity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

That which is claimed is:

1. A system comprising:
   at least one piece of equipment;
   a state detector adapted to measure one or more operating parameters of the equipment;
   a signature generator adapted to encode a plurality of data streams from the state detector into an operating signature for the equipment,
      wherein the plurality of data streams comprises a data value from the state detector, and
      wherein encoding the data value comprises:
         identifying a first encode key specifying a first numeric value and a first bit location in the operating signature and a second encode key specifying a second numeric value and a second bit location in the operating signature, wherein the first encode key and the second encode key are associated with the state detector,
         setting a bit at the first bit location when the data value is above the first numeric value, and
         setting a bit at the second bit location when the data value is below the second numeric value; and
   a health engine adapted to determine how the equipment's operation is changing over time based on the operating signature.

2. The system of claim 1, further comprising a rule set containing a plurality of rules that correspond to actions to be taken in response to known signatures of the equipment.

3. The system of claim 2, further comprising a signature analyzer adapted to compare an operating signature from the signature generator with a known signature from the rule set.

4. The system of claim 2, further comprising a user interface adapted to output a recommended action when an operating signature from the signature generator matches a known signature from the rule set.

5. The system of claim 2, further comprising a learning module adapted to detect a failure, identify one or more symptoms of the failure, assign a new signature associated with the failure and the symptoms, and assign one or more actions to take in response to the new signature.

6. The system of claim 1, further comprising a status engine adapted to determine if the equipment is operating.

7. The system of claim 1, further comprising a performance engine adapted to determine, using the operating signature, if the equipment is performing according to at least one selected from a group consisting of a model of the equipment and a design of the equipment.

8. The system of claim 1, wherein the health engine identifies trends in the operation of the equipment.

9. The system of claim 1, further comprising a benchmark engine adapted to compare the operation of the equipment with other similar equipment.

10. A system comprising:
    at least one piece of equipment;
    a state detector adapted to measure one or more operating parameters of the equipment;
    a signature generator adapted to encode a plurality of data streams from the state detector into an operating signature for the equipment,
       wherein the plurality of data streams comprises a data value from the state detector, and
       wherein encoding the data value comprises:
          identifying a first encode key specifying a first numeric value and a first bit location in the operating signature and a second encode key specifying a second numeric value and a second bit location in the operating signature, wherein the first encode key and the second encode key are associated with the state detector,
          setting a bit at the firsts bit location when the data value is above the first numeric value, and
       setting a bit at the second bit location when the data value is below the second numeric value; and
    a performance engine adapted to determine, using the operating signature, if the equipment is performing according to at least one selected from a group consisting of a model of the equipment and a design of the equipment.

* * * * *